United States Patent [19]

Altman

[11] 4,111,112

[45] Sep. 5, 1978

[54] FRUIT SECTIONIZING MACHINE

[76] Inventor: James E. Altman, Box 334, Gray, Ga. 31032

[21] Appl. No.: 679,381

[22] Filed: Apr. 22, 1976

[51] Int. Cl.$^2$ .................... A23N 4/00

[52] U.S. Cl. .................... 99/538; 99/545

[58] Field of Search .................... 99/537-538, 99/543, 545; 83/425, 425.2, 496, 404.1; 30/113.3, 114

[56] References Cited

U.S. PATENT DOCUMENTS

| | | | |
|---|---|---|---|
| 1,825,628 | 9/1931 | Floyd | 99/538 |
| 1,825,629 | 9/1931 | Floyd | 99/545 |
| 2,540,014 | 1/1957 | Smith | 83/496 |
| 3,830,151 | 8/1974 | Gerson | 99/537 |

*Primary Examiner*—Peter Feldman
*Assistant Examiner*—Robert Pous
*Attorney, Agent, or Firm*—Hill, Gross, Simpson, Van Santen, Steadman, Chiara & Simpson

[57] ABSTRACT

Apparatus and method for sectioning oranges and other fruit which preferably has been previously cored and peeled. Fruit is positioned over a spindle and allowed to move preferably downwardly into a plurality of revolving, circular blades whose respective peripheries are in edge adjacent relationship to said spindle. The fruit in passing through these blades is sectioned. Blades can be offset from a radially extending relationship to said spindle if desired for obtaining oblique angles of sectionizing.

18 Claims, 6 Drawing Figures

Fig. 3
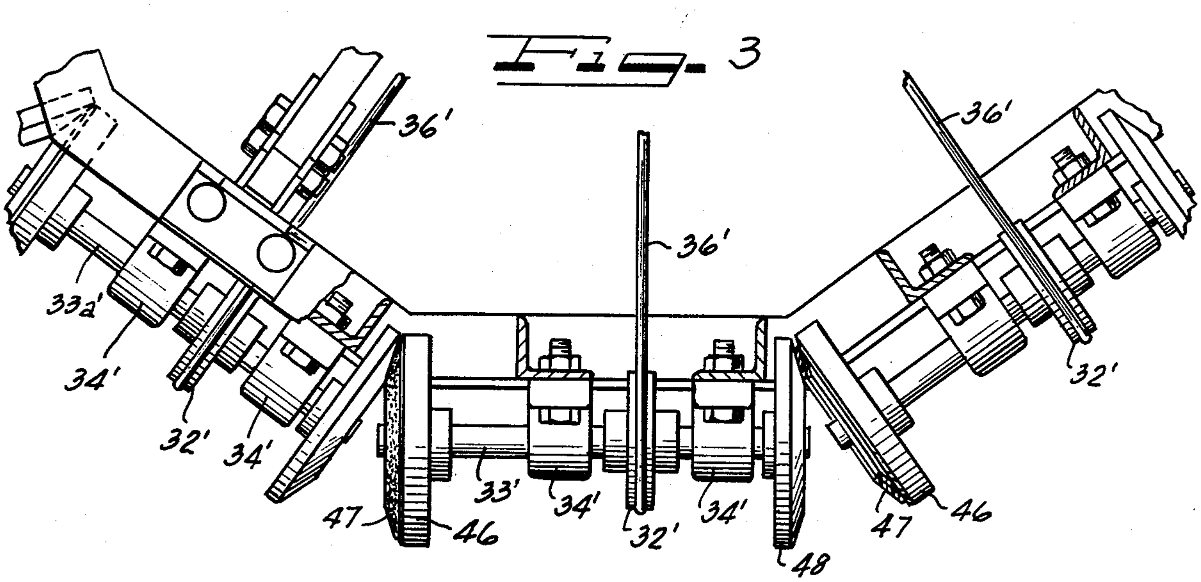
Fig. 4
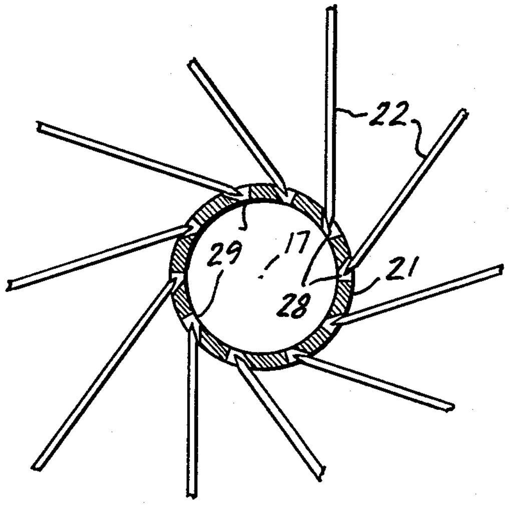
Fig. 5
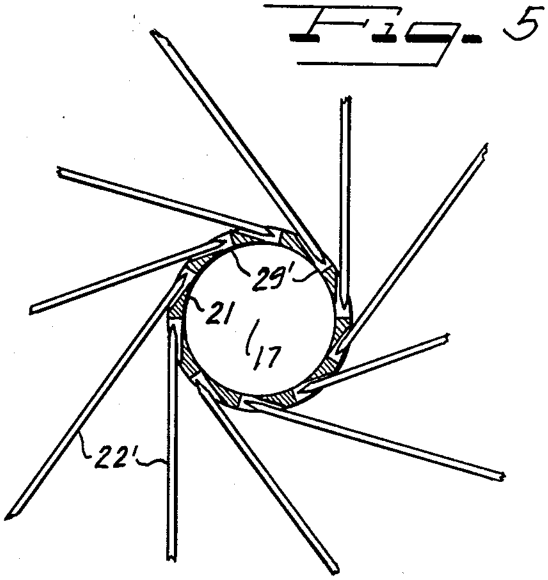
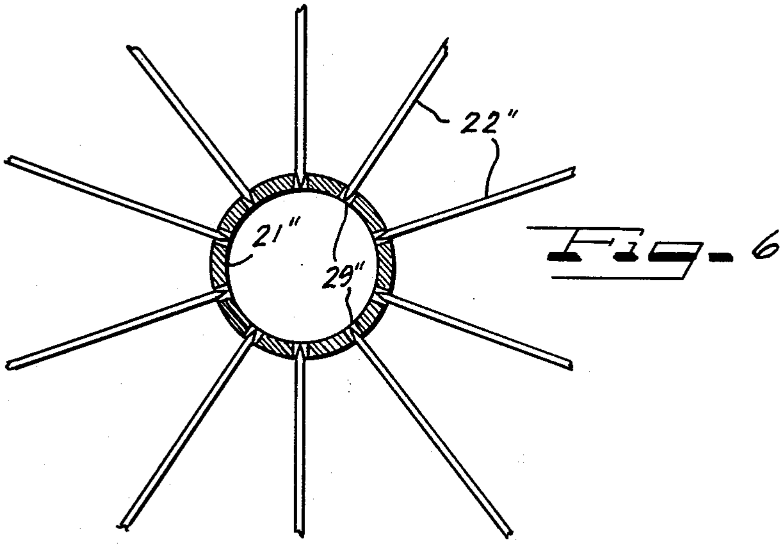
Fig. 6

FRUIT SECTIONIZING MACHINE

BACKGROUND OF THE INVENTION

In the Prior Art, so far as such is now known, all citrus fruit, such as oranges, were hand sectionized, typically following an initial peeling operation, to remove and separate segments from a single such fruit. The hand labor required for this operation has become so expensive that the finished product cost has become prohibitively high for many end use purposes and markets.

BRIEF SUMMARY OF THE INVENTION

The present invention provides an apparatus, and an associated technique for using same, which is adapted to sectionize citrus fruit such as oranges and the like, as well as other types of fruit. A great volume of fruit can be processed by a single embodiment of apparatus of this invention compared to manual, hand-tool augmented sectionizing, and the product sectionized fruit from apparatus of this invention has a good appearance.

More particularly, the present invention is directed to apparatus of the type indicated which employs a plurality of circular blade means which are rotatably driven. The individual blade means are circumferentially spaced in relationship to one another about a spindle. The blade means are of preferably equal size, and the axes of all the individual blade means are generally oriented in the same angular relationship relative to radii thereto from the axis of the spindle. The peripheral edge of each such blade means is positioned in spaced, proximate relationship to such spindle, and preferably a spindle is longitudinally slotted so that such peripheral edges extend radially beyond the spindle profile into edge portions of the spindle.

In another aspect, the present invention is directed to a method for sectionizing fruit in which fruit is positioned on a spindle and caused to move axially along the spindle into a plurality of rotating circular blade means which are characterized by having their peripheral blade edges in spaced but proximate relationship to such spindle.

A principal feature of the present invention is to provide a mechanism for automatically sectionizing oranges and other fruit so as to avoid the time and labor-consuming sectioning operations heretofore conducted by hand.

Another object is to provide a simple, reliable, easily maintained apparatus for mechanically sectionizing fruit and the like.

Another object is to provide a simple, effective method for mechanically sectionizing fruit and the like.

Other and further objects, aims, purposes, advantages, features and the like will be apparent to those skilled in the art from the present specification taken with the drawings.

BRIEF DESCRIPTION OF THE DRAWINGS

In the Drawings:

FIG. 3 is a fragmentary view of an alternative embodiment of apparatus similar to that of FIG. 1 showing a different blade drive arrangement;

FIG. 4 is a fragmentary transverse sectional view across the spindle region of the apparatus embodiment shown in FIG. 1, some parts thereof broken away and some parts shown in section, illustrating the manner in which the circular blades are located in relationship to the spindle;

FIG. 5 is a view similar to FIG. 4 but showing an alternative arrangement for locating blades in relationship to the spindle; and FIG. 6 is a view similar to FIG. 5, but showing a further alternative arrangement.

DETAILED DESCRIPTION

Figure 1:
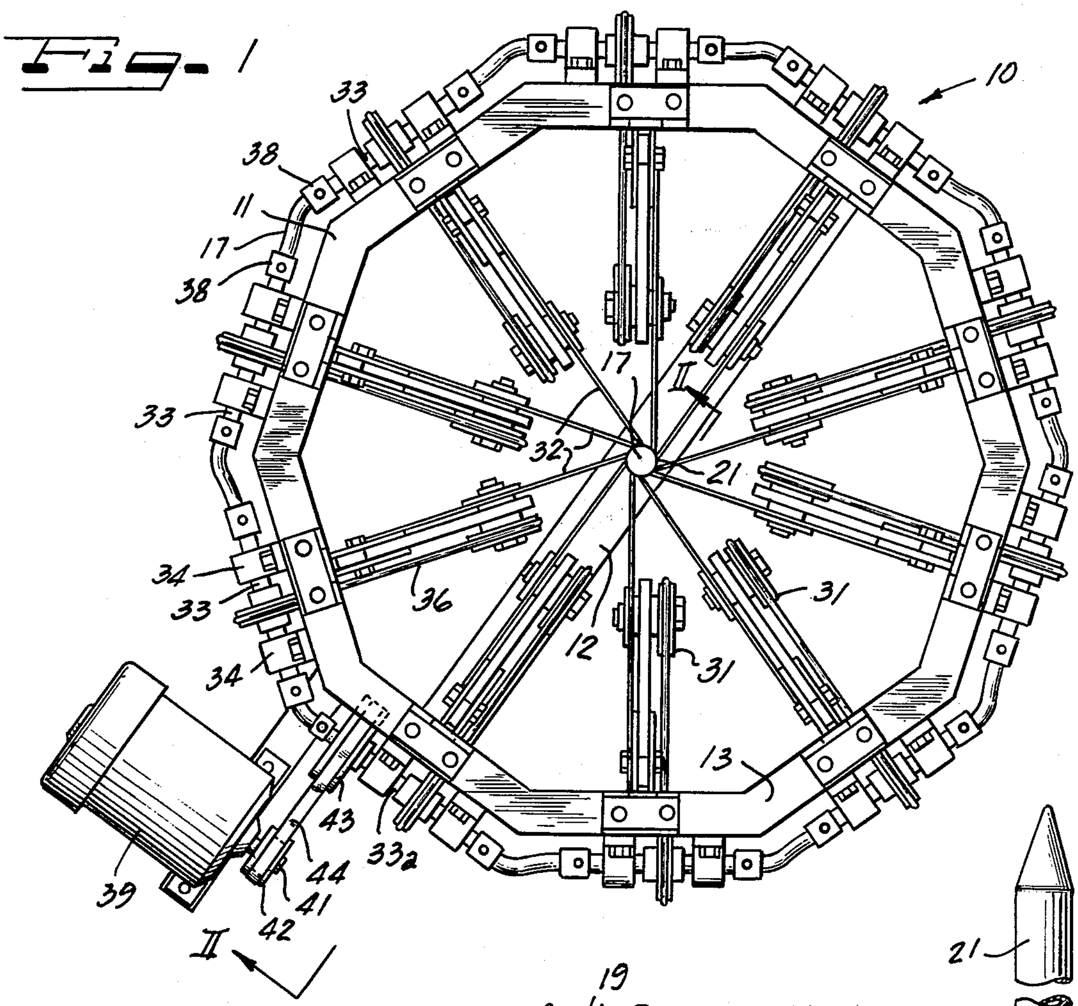
FIG. 1 is a plan view of one embodiment of a sectionizing machine of the present invention.
Figure 2:
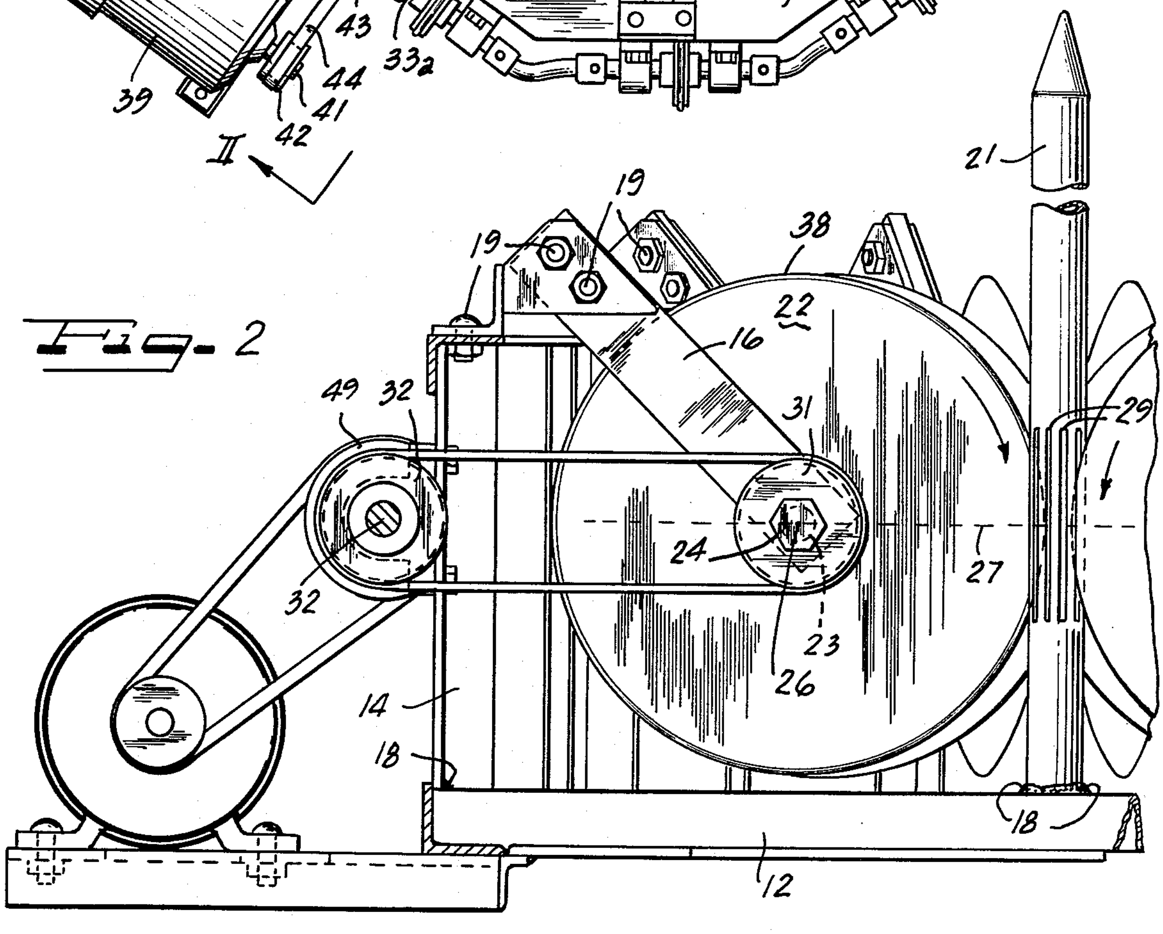
FIG. 2 is a vertical sectional view taken along the line II—II of FIG. 1.

Turning to the drawings there is seen in FIGS. 1, 2 and 4 an embodiment of sectionizing apparatus of the present invention herein designated in its entirety by the numeral 10. Apparatus 10 employs a supporting frame herein designated in its entirety by the numeral 11.

The supporting metal frame 11 includes ground engaging members 12 and members 13 defining a closed loop. Vertically upstanding members 14 support and maintain the closed loop defined by members 13 in vertically spaced, horizontally extending relationship to the ground engaging members 12. Preferably the ground engaging members 12 also define a closed loop, or the equivalent thereof, for reasons of structural rigidity for frame 11. A plurality of inwardly extending bracket arm downwardly projecting assemblies 16 (apparatus 10 employs ten such arm assemblies 16) extend radially in circumferentially equally spaced relationship to one another towards the center axis 17 of apparatus 10. Each of the arms 16 terminates in about equally radially spaced relationship to the center 17. These various elements 12, 13, 14 and 16 of frame 11 are positioned maintained in a fixed desired relationship one to another by any conventional means, such as by means of weldings 18 and nut and bolt assemblies 19.

An upstanding stationary elongated metal spindle 21 (which is conveniently hollow) located generally coaxially with center 17 as fixed at its base to a ground engaging member 12. If desired, spindle 21 can be demountably mounted (not detailed) to the ground engaging members 12 to facilitate through cleaning of apparatus 10 after a use thereof for fruit sectionizing.

A plurality of circular blades 22 (a total of ten such blades 22 being here employed) are utilized in apparatus 10; each blade 22 is provided with a stub shaft 23 and conventional journal means (not detailed). Preferably, as shown, all blades have equal diameters. Each shaft 23 is mounted (as by a nut 24 threadably received on one end of shaft 23) adjacent the terminal inward end region of a different one bracket arm 16 and each blade 22 is adapted for axial rotational movement on shaft 23.

Depending upon its construction, an embodiment of the present invention can utilize any desired number of circular blades, such as blades 22, though usually at least two such blades are always used, as those skilled in the art will readily appreciate. Apparatus 10 can be operated with fewer than 10 blades by simply removing one or more blades to create a sectioning pattern as desired by a machine user for a particular sectionizing operation.

Each blade 22 is located in apparatus 10 in circumferentially spaced relationship to other blades 22 relative to spindle 21 and its center 17. Each blade 22 has an axis 26 which is generally and preferably (as shown) perpendicularly oriented relative to the axis or center 17. All axes 26 of the plurality of blades 22 are generally located in a common plane which is diagramatically illustrated in, for example, FIG. 2 by dotted line 27.

The peripheral edge 28 of each blade 22 is located so as to be in spaced but proximate relationship to spindle 21. In apparatus 10, spindle 21 is provided in the region thereof opposed to zone of convergence of the plurality of blades 22 with a plurality of equally circumferentially spaced, longitudinally extending parallel recesses or slots 29 (there being ten recesses 29 in all formed in spindle 21). The relationship between each blade 22 and the spindle 21 is such that each peripheral blade edge 28 nests in a different one mating recess 29 in the spindle 21. In order to always achieve a complete cut through on each piece of fruit being sectioned in an operating apparatus 10 at any given time, it is preferred to have the peripheral edges 28 all radially extend inwardly into spindle 21 into recesses 29 in an apparatus 10.

A plurality of rotatable first pulleys 31 (there being ten first pulleys 31 in all) are provided. Each first pulley 31 is associated functionally with a different one of the blades 22 about its associated shaft 23 so that each first pulley 31 when rotated is adapted to drive rotatably its associated blade 22.

A plurality of rotatable second pulleys 32 are provided (there being ten second pulleys 32 in all). Each second pulley 32 has a shaft 33 axially extendng through and mounting same rigidly. Each shaft 32 on portions thereof adjacent each side of second pulley 32 is journaled in a bearing block 34, there being two bearing blocks 34 for each shaft 33. Each bearing block 34 is mounted fixedly to the supporting frame 11. Each second pulley 32 is located in circumferentially spaced relationship to the other pulleys 32. In effect, each second pulley 32 functions as a power transfer station which is adapted to transfer rotational power in a direction generally radially relative to its associated shaft 33 when such shaft 33 is driven. Each of the second pulleys 32 is generally aligned with each of the first pulleys 31. An endless drive belt 36 operatively engages a different so-aligned pair of the first pulleys 31 and the second pulleys 32, so that when the second pulley 32 is driven the first pulley 31 revolves and turns its associated circular blade 22.

Each shaft 33 is adjacent another such shaft with the adjacent respective shaft ends being angularly disposed relative to one another. These angularly disposed ends are interconnected in each instance by a flexible shaft 37 which is clamped to each shaft 33 by means of a coupling 38. An electric motor 39 serves as a power head adapted to rotatably drive one shaft 33A. Thus, motor 39 has a driven shaft 41 on which is mounted a pulley 42.

Shaft 33A has with it associated a pulley 43 which is arranged to be aligned with the pulley 42. An endless drive belt 44 interconnects the pulleys 42 and 43 so that when motor 39 is operating shaft 33A is driven as are all other shafts 33. In this way the circular blades 22 are revolved in apparatus 10.

Instead of the flexible shaft arrangement employed in apparatus 10, one may employ alternatively if desired a fixed shaft arrangement such as is shown for example in FIG. 3. In FIG. 3 components which are similar to those employed in the apparatus of FIG. 10 are designated with similar reference numerals except that prime marks are added thereto.

At one end of shaft 33′ is rigidly mounted a plate 46 equipped with a bevelled urethane edge region 47. The opposed ends of shaft 33′ has rigidly fixed thereto an aluminum plate 48 which has likewise a bevelled edge region. The bevelled surface of plate 46 is adapted to make frictional engagement with the bevelled surface of plate 48. Thus plate 46 serves to frictionally drive plate 48. Any convenient shaft system can be employed for rotatably driving second pulleys 32 or 32′ and the associated drive belts 36 or 36′ as those skilled in the art will readily appreciate.

The angle at which a circular blade 22 is inclined with respect to a radius from center 17 can be increased such as is illustrated for example in FIG. 5. Here, each circular blade 22′ is oriented and arranged relative to a spindle 21′ in a tangential manner and the recesses 29′ are formed in the spindle 21′ accordingly. In the sectioning of certain types of fruit, such as peeled and cored oranges, it is sometimes preferred to have blades such as blades 22 or 22′ which are generally obliquely oriented relative to the center 17 so as to have the sectioning cut across the normally radially extending naturally occurring segments found in oranges. Such an angular sectioning improves the physical appearance of the fruit since none of the membrane with obliquely extending blades ever shows except as a single line in the sectioned fruit.

If desired, however, the blades can extend radially, in the manner shown, for example, in FIG. 6 where blades 22″ radially extend into recesses 29″ appropriately formed in a spindle 21″. Such a radially extending blade arrangement may be conveniently employed in the sectioning of, for example, peeled and cored pears and apples, if desired.

In a preferred embodiment of the present invention, such as apparatus 10, the spindle 21 preferably seats or is mounted against a frame member 12 which has a corner or shoulder upwardly extending at the point where spindle 21 engages same. Thus, after fruit is sectioned, and continues downwardly, the frame member 12 serves to guide and separate the now sectioned fruit into some sort of receptacle (not shown). Thereby providing a sort of self-cleaning action aiding in preventing any hand up of sectioned fruit in the vicinity of the rotating blades 22.

In utilizing an embodiment of this invention such as apparatus 10, fruit is mounted over the spindle 21. The fruit is typically cored and also peeled before treatment by an embodiment of this invention. In any given fruit, the core diameter is preferably such as to permit the so-prepared fruit to easily slip over and slidably engage circumferential side sufaces of spindle 21.

Next, the fruit is moved along the spindle. In apparatus 10, such movement is conveniently accomplished by gravity. As the fruit moves over the spindle 21, it is brought into a zone containing the plurality of rotating circular blade members 22.

The blade members 22 are substantially larger than the radial thickness of the fruit on the spindle 21. Each blade member 22 has generally the same angular relationship to radii from the spindle axis 17. The peripheral 28 of each blade member 22 is in spaced proximate relationship to the spindle 21 as indicated earlier. In passing through the zone of rotating blades 22, the fruit is sectioned and is thereafter collected.

Apparatus 10 is preferably operated in a spatial orientation wherein spindle 21 is vertical. Preferably the blade members 22 rotate at a relatively high radial velocity. In one form of an apparatus 10, the blade members each have about the same diameter. For example, in one presently preferred embodiment of apparatus of this invention each blade member rotates at a radial velocity of from about 800 to 1000 revolutions per minute and each blade member has a diameter ranging from about 10 to 16 inches.

Preferably all moving portions of an embodiment of this invention are appropriately shielded for operator safety. Even the pulleys 32 can be equipped with shields 49, preferably. Spindle 21 is preferably hollow. Many different sizes and numbers of blades, spindles, and the like may be employed even in an individual embodiment of this invention as those skilled in the art will appreciate.

Other and further modes and embodiments of the present invention will be apparent to those skilled in the art from the preceding description and no undue limitations are to be assumed therefrom, as those skilled in the art will readily appreciate.

I claim:

1. Apparatus adapted for sectioning cored fruit comprising supporting frame means, an upstanding stationary spindle associated in a base region thereof with said frame means having an axis and having a plurality of longitudinally extending, circumferentially spaced slot means defined therein, the maximum diameter of said spindle being less than the diameter of the core cavity in such cored fruit, a plurality of rotatable circular blade means, each said blade means having an axis and including an associated axially located stub shaft means and journal means, individual blade means of said plurality being positioned in circumferentially spaced relationship to one another by said frame means about said spindle axis, each said blade means axis having generally the same angular relationship to radii from said spindle axis, the peripheral edge of each said blade means being in spaced, proximate relationship to a different one of said slot means, a power head, a shaft system rotatably drivable by said powerhead, including journal means supporting same by said frame means, said shaft system operatively extending circumferentially about said peripheral blade means edges in radially spaced relationship thereto, and a plurality of power transfer means, each said power transfer means being adapted to transfer rotational power in a direction generally radially relative to said shaft system from said drivable shaft system to each one of said blade means for rotatably driving said blade means, whereby such cored fruit in being sectioned passes along said spindle through said plurality of blades without radial expansion forces acting thereon due to the shape of said spindle.

2. The apparatus of claim 1 wherein each said blade means extends generally radially relative to said spindle axis.

3. The apparatus of claim 2 wherein each said blade means extends generally obliquely relative to said spindle axis with each said blade means being inclined at a similar angle relative to intersecting radii from said spindle axis.

4. The apparatus of claim 1 wherein said spindle is fixed to said frame means.

5. The apparatus claim 1 wherein said spindle is demountably mounted to said frame means.

6. The apparatus of claim 1 wherein the axis of each one of said blade means is generally perpendicularly oriented relative to the axis of said spindle and the axes of said blade means of said plurality are generally located in a common plane.

7. The apparatus of claim 1 wherein said shaft system comprises (A) a plurality of power transfer stations, each one located in spaced, adjacent relationship to a different one of said peripheral blade edges, and in circumferentially spaced relationship to the other such power transfer stations, (B) first linkage means for transferring power from said power head to one of said power transfer stations, and (C) second linkage means for transferring power from each one of said power stations to circumferentially adjacent ones of said power transfer stations, and wherein said one of said power transfer means comprises a bearing mount means associated with said frame means and a shaft journaled therein.

8. The apparatus of claim 7 wherein said first linkage means comprises a drive pulley mounted on said power head and drivable thereby, a driven pulley associated with said one power transfer station and located for driving by said drive pulley, and endless belt means interconnecting and extending around the respective circumferences of said drive pulley and said driven pulley.

9. The apparatus of claim 7 wherein each said second linkage means comprises flexible shaft means.

10. The apparatus of claim 7 wherein said second linkage means comprises a pair of edge engaging plates, each plate being supported by a shaft rotatably associated with a different but adjacent one of said power transfer stations, the rim portion of one of said plates being adapted to drive rotatably the rim portion of the other of said plates.

11. The apparatus of claim 7 wherein each one of said power transfer stations has a transfer pulley associated with said shaft thereof, each one of said blade means has another pulley aligned with said transfer pulley which is coaxially mounted therewith and adapted for driving same, and endless belt means interconnects said transfer pulley and said other pulley.

12. The apparatus of claim 1 wherein said spindle is hollow.

13. Apparatus adapted for sectioning cored fruit comprising (A) supporting frame means including ground engaging means, members defining a closed loop which is vertically spaced from and horizontally extends over said ground engaging members, upstanding supporting members between said ground engaging member means and said closed loop members, and a plurality of inwardly extending bracket arms from said closed loop each terminating in about equally spaced relationship to the center region of said closed loop, (B) an elongated upstanding stationary spindle in said central region whose base portion joins said grounding engaging member means, said spindle having a plurality of longitudinally extending, circumferentially spaced slot means defined therein, the maximum diameter of said spindle being less than the diameter of the core cavity in such cored fruit, (C) a plurality of rotatable circular blade means, each said blade means including an associated axial stub shaft means and journal means, each said blade means being mounted to a different end portion of one said bracket arm, each said blade means being located in circumferentially spaced relationship to one another relative to said spindle with (1) the axis of each said blade means being generally perpendicular to the axis of said spindle, (2) all axes of said plurality of blade means being generally located in a common plane, (3) the peripheral edge of each said blade means being in spaced but proximate relationship to a different one of said slot means, (D) a plurality of rotatable first pulley means, each one associated with a different one of said stub shaft means and adapted to drive rotatably the associated blade means, (E) a plurality of rotatable second pulley means, each one including axisl shaft means and journal means, and further including holding bracket means mounting such to said frame means generally operatively aligned with a different one of said first pulley means, there being one said second pulley means for each said circular blade means, each said second pulley means being located in circumferentially spaced relationship to one another relative to said spindle with each said holding bracket being secured to said closed loop adjacent the peripheral edge of a different one of said blade means, (F) a plurality of drive belt means, each said drive belt means operatively engaging a different so aligned pair of said first and second pulley means, (G) power transfer means and interconnecting means interconnecting said respective second pulley means for common rotational movements, and (H) a powerhead adapted to rotatably drive said second pulley means, whereby such cored fruit in being sectioned passes along said spindle through said plurality of blades without radial expansion forces acting thereon due to the shape of said spindle.

14. The apparatus of claim 13 wherein said spindle is demountably mounted to said ground engaging member means.

15. The apparatus of claim 13 wherein said ground engaging member means at least in the region of said spindle has downwardly receding side edge portions relative to said spindle.

16. The apparatus of claim 13 wherein said spindle is hollow.

17. The apparatus of claim 13 wherein said blade means extends generally radially relative to said spindle axis.

18. The apparatus of claim 13 wherein said blade means extends obliquely relative to said spindle axis with each said blade means being inclined at a similar angle relative to intersecting radii from said spindle axis.

* * * * *